United States Patent
Miers et al.

(10) Patent No.: US 11,184,049 B2
(45) Date of Patent: Nov. 23, 2021

(54) SYSTEMS AND METHODS FOR SIGNAL ISOLATION IN RADIO FREQUENCY CIRCUIT BOARDS

(71) Applicant: Ball Aerospace & Technologies Corp., Boulder, CO (US)

(72) Inventors: Zachary T. Miers, Broomfield, CO (US); Ray Lovestead, Louisville, CO (US); Peter J. Moosbrugger, Lafayette, CO (US)

(73) Assignee: Ball Aerospace & Technologies Corp., Boulder, CO (US)

(*) Notice: Subject to any disclaimer, the term of this patent is extended or adjusted under 35 U.S.C. 154(b) by 91 days.

(21) Appl. No.: 16/522,064

(22) Filed: Jul. 25, 2019

(65) Prior Publication Data

US 2020/0052737 A1    Feb. 13, 2020

Related U.S. Application Data

(60) Provisional application No. 62/717,451, filed on Aug. 10, 2018.

(51) Int. Cl.
| | |
|---|---|
| *H04B 3/32* | (2006.01) |
| *H04B 1/10* | (2006.01) |
| *H04B 1/12* | (2006.01) |
| *H04B 1/711* | (2011.01) |
| *H04B 3/30* | (2006.01) |

(52) U.S. Cl.
CPC ............. *H04B 3/32* (2013.01); *H04B 1/1036* (2013.01); *H04B 1/12* (2013.01); *H04B 1/711* (2013.01); *H04B 3/30* (2013.01)

(58) Field of Classification Search
CPC .......... H04B 1/10; H04B 1/1009; H04B 1/12; H04B 1/18; H04B 1/68; H04B 1/711;
(Continued)

(56) References Cited

U.S. PATENT DOCUMENTS

| | | | |
|---|---|---|---|
| 5,105,171 A | * | 4/1992 | Wen ........................ H01P 5/186 333/115 |
| 5,436,405 A | | 7/1995 | Hogge, Jr. et al. |

(Continued)

OTHER PUBLICATIONS

Cheung et al , Shielded Passive Devices for Silicon-Based Monolithic Microwave and Millimeter-Wave Integrated Circuits, IEEE, 18 pages, May 2006.*

(Continued)

*Primary Examiner* — Frank Duong
(74) *Attorney, Agent, or Firm* — Sheridan Ross P.C.

(57) ABSTRACT

Systems and methods for isolating radio frequency (RF) signals in high frequency circuit assemblies, including but not limited to 5G communication systems, are provided. The circuit assemblies include an RF suppression structure, which can be in the form of a low ohm resistor, that extends across a transmission line, and that has contacts that are electrically joined to a ground plane. Alternatively or in addition, the circuit assemblies include a low ohm resistor that extends over a transition between a signal via and an end of a transmission line, and that has contacts that are electrically joined to a ground plane. A circuit assembly as disclosed herein can further include multiple low ohm resistors spaced apart from one another by a distance that is a fraction of a wavelength of a highest frequency signal carried by the transmission line.

20 Claims, 6 Drawing Sheets

(58) Field of Classification Search
CPC .......... H04B 1/1036; H04B 3/32; H04B 3/30; H01P 1/162; H01P 3/006; H01P 3/081; H05K 1/0219; H05K 1/0237; H05K 3/222; H05K 3/42; H05K 2201/09618; H05K 2201/10363; Y10T 29/49144; Y10T 29/49149; Y10T 29/53174
See application file for complete search history.

(56) References Cited

U.S. PATENT DOCUMENTS

| | | | | |
|---|---|---|---|---|
| 5,495,211 | A * | 2/1996 | Liechty | H01P 1/15 |
| | | | | 327/369 |
| 5,596,804 | A * | 1/1997 | Hogge, Jr. | H01P 3/081 |
| | | | | 29/840 |
| 5,905,465 | A * | 5/1999 | Olson | H01Q 1/246 |
| | | | | 343/700 MS |
| 6,023,209 | A * | 2/2000 | Faulkner | H01L 23/66 |
| | | | | 257/664 |
| 10,374,304 | B2 * | 8/2019 | Taniguchi | H01Q 1/52 |
| 2010/0045400 | A1 | 2/2010 | Wu et al. | |

OTHER PUBLICATIONS

Wong et al, Microstrip-line-fed Compact Microstrip Antenna with Broadband Operation, IEEE, 4 pages, 1998.*
International Search Report and Written Opinion for International (PCT) Patent Application No. PCT/US2019/043350, dated Oct. 14, 2019 15 pages.

* cited by examiner

SYSTEMS AND METHODS FOR SIGNAL ISOLATION IN RADIO FREQUENCY CIRCUIT BOARDS

CROSS-REFERENCE TO RELATED APPLICATIONS

This application claims the benefit of U.S. Provisional Patent Application Ser. No. 62/717,451, filed Aug. 10, 2018, the entire disclosure of which is hereby incorporated herein by reference.

FIELD

The present disclosure is directed to systems and methods for reducing radio frequency radiation and coupling in circuit assemblies containing signal lines and signal line transitions carrying radio frequency signals.

BACKGROUND

High frequency electrical signals are often present in modern electrical designs, including in radio frequency (RF) communication system components. Electrical circuit designs are also becoming denser and more complex. In addition, RF communications links are increasingly being used to transfer information, and to control devices. For example, the introduction of 5G communications systems is expected to be accompanied by a dramatic increase in the number of devices dependent on reliable, high speed, RF communications links.

One important consideration in designing and implementing RF circuits is minimizing unwanted RF oscillations. Such oscillations can be the result of coupling between components included in a circuit, circuit board, or circuit board stack carrying RF signals. Features of a circuit board that are often associated with unwanted coupling include RF via transitions, and RF signal lines that are close to one another. In the case of RF via transitions, the increased size of the via pad relative to the via itself can create a reflection, resulting in an undesirable radiation of energy. In the case of signal lines that are routed near one another, the RF signal lines can effectively be coupled to one another.

In a typical RF circuit design, a metal shielding enclosure or "can" is used to prevent or attenuate RF radiation and coupling, thus allowing a given system to comply with FCC requirements, or to prevent RF coupling into nearby circuits. However, metal shielding can be expensive to produce and install, can interfere with cooling and access requirements, and can increase the size of the assembly. Another technique for controlling radiation and coupling is to use grounded coplanar waveguides (CPWGs) or RF stripline. However, the use of such grounded coplanar waveguides alone may not provide adequate isolation. In addition, stripline requires via transitions, which can also increase costs and create transitions that radiate RF energy. Signal isolation vias, microvias, and conductive paste applied between circuit board layers can also be used to isolate RF signal lines. However, the use of such structures complicates the design and manufacturing process of the circuit, increasing costs and complexity. Still other techniques include providing an RF absorber, alone or in combination with other RF emission mitigation techniques. Adding an absorber also can increase costs and can also interfere with cooling and access requirements.

Accordingly, it would be desirable to provide an alternative structure and technique for preventing unwanted RF emissions and coupling that could be used in place of or concurrently with existing structures and techniques, and that could be employed relatively easily and economically.

SUMMARY

Embodiments of the present disclosure are directed to solving these and other problems and disadvantages of other structures and techniques for preventing unwanted RF emissions and coupling. More particularly, embodiments of the present disclosure provide systems and methods for reducing unwanted RF emissions and coupling between components in an RF circuit, and that can be implemented relatively economically. In accordance with at least some embodiments of the present disclosure, RF signal isolation is achieved by incorporating RF suppression structures that include RF suppression devices located at various points along a signal line. The RF suppression devices may be in the form of standard off the shelf resistors. Moreover, systems and methods in accordance with embodiments of the present disclosure can be applied alone or in combination with other structures and techniques of reducing unwanted RF emissions and coupling between components.

Systems and methods in accordance with embodiments of the present disclosure can include placing an RF emission suppression device as described herein over circuit features to suppress RF emissions. The RF emission suppression device can be in the form of a low ohm resistor. As used herein a low ohm resistor can include a zero or near zero ohm resistor. The low ohm resistor is placed transverse to an RF transmission line. The leads of the low ohm resistor are electrically connected to ground. For example, where the RF transmission line is located within a slot or tunnel formed between portions of a ground structure, the leads of the low ohm resistor can be connected to that ground structure or to elements of the ground structure on either side of the RF transmission line. The body or portion of the low ohm resistor that extends over the RF transmission line, can be kept electrically isolated from the RF transmission line. In accordance with further embodiments of the present disclosure, an RF emission suppression structure can include a plurality of low ohm resistors that are placed at intervals along the RF transmission line.

In accordance with further embodiments of the present disclosure, a low ohm resistor can be placed over a via transition. As used herein, a via transition can include the area in which a signal via that extends in a direction perpendicular to a stripline or other transmission line is electrically connected to that transmission line.

The low ohm resistor can have a relatively low resistance value, for example from 0.010 ohm to 0.050 ohm. The low ohm resistor can also include a zero ohm, near zero ohm (e.g. 0.001 ohm to 0.003 ohm) resistor. In accordance with at least some embodiments of the present disclosure, the type of resistor used to provide isolation is a surface mount device (SMD) or chip resistor. The resistor may be placed on the circuit structure or printed circuit board (PCB) containing the circuit features for which RF suppression is desired in a pick and place operation and can then be soldered to ground conductors or a ground plane included in the circuit structure.

Embodiments of the present disclosure provide relatively low cost and easily implemented structures and systems for reducing or eliminating coupling and unwanted RF oscillations in a circuit board or other circuit structure.

Additional features and advantages of embodiments of the disclosed systems and methods will become more readily

DETAILED DESCRIPTION

Figure 1:
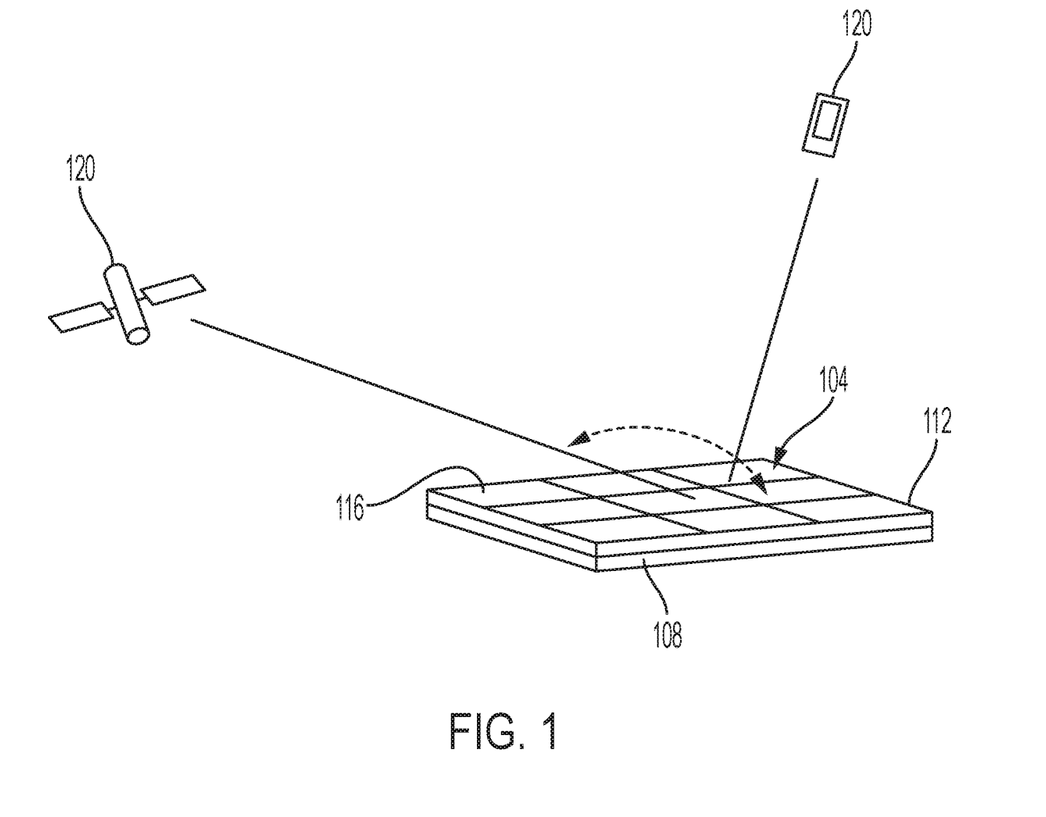
FIG. 1 depicts a communication system incorporating RF suppression structures in accordance with embodiments of the present disclosure in an example operational scenario.

FIG. 1 depicts a system 104 that includes a circuit or circuit board assembly 108 incorporating a suppression structure in accordance with embodiments of the present disclosure. In this example, the system 104 is an antenna system that incorporates a phased array antenna 112 having a plurality of radiating elements 116 connected to an RF transceiver by RF signal lines in the circuit assembly 108, such as may be included in a base station of a 5G or satellite communication system that supports communications with remote devices 120. However, a circuit assembly 108 in accordance with embodiments of the present disclosure can be included in any system in which RF signals are present, and in which the suppression of unwanted RF emissions is necessary or desired.

Figure 2:
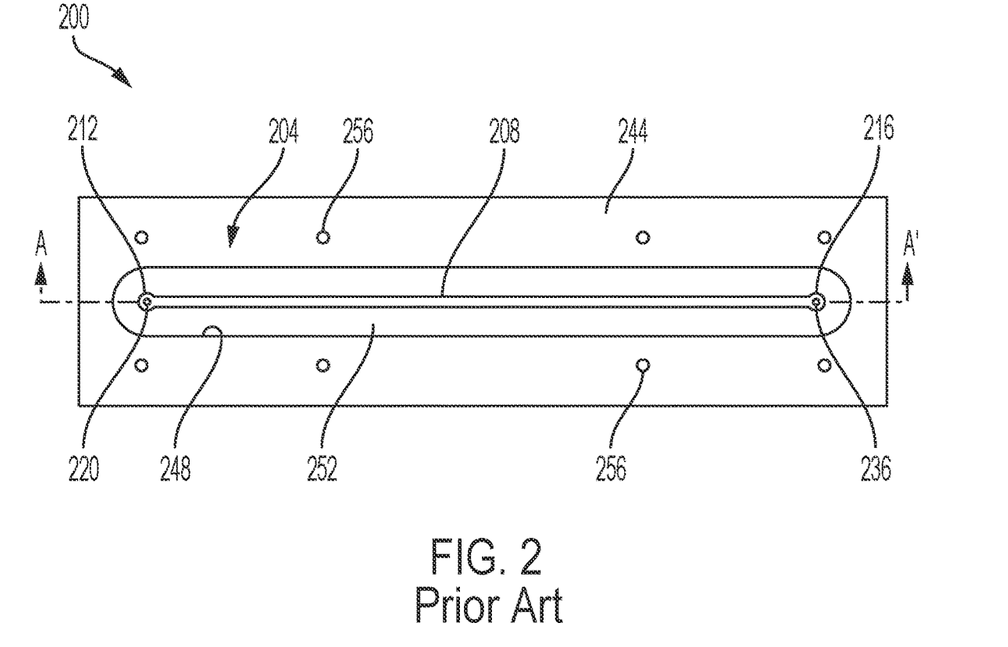
FIG. 2 is a top plan view of a typical RF microstrip/CPWG line with via transitions.
Figure 3:
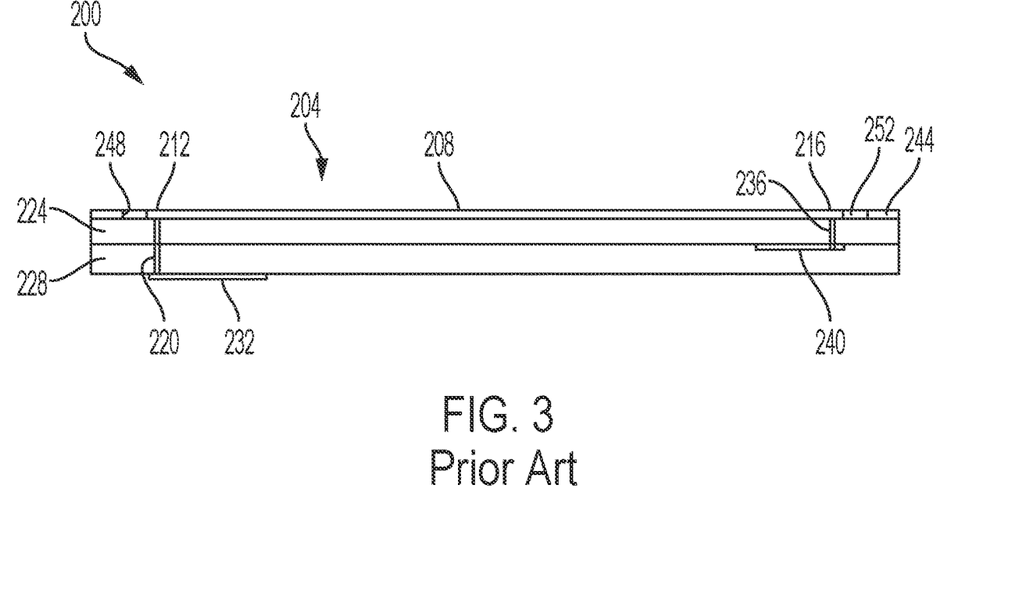
FIG. 3 is a cross section view of the RF microstrip/CPWG line with via transitions of FIG. 2.

As background, an example of a portion of a circuit or circuit board assembly 200 that includes a typical RF microstrip/CPWG line or signal line 204, and which can be incorporated into an electrical system for the transmission of microwave or other RF frequency signals, such as an antenna system, is depicted in a top plan view in FIG. 2, and in a cross section in elevation taken along line A-A' of FIG. 2 in FIG. 3. The signal line 204 generally includes a transmission line or section 208 that in this example extends between a first signal via transition or first via transition 212 and a second signal via transition or second via transition 216. The first via transition 212 is at a first end of the transmission line 208, and is the point or area at which a first signal via 220 that extends in a direction that is generally perpendicular to the first (e.g. top) and second (e.g. bottom) surfaces of the circuit assembly 200 is connected to the transmission line 208. In this example, the first signal via 220 extends through a first insulating layer 224 and a second insulating layer 228 to connect to a signal line or component 232 in another layer of the assembly 200, here on the surface of the circuit board assembly 200 opposite the surface on which the transmission line 208 is located. As examples, a signal line or component 232 formed on a surface of the circuit board assembly 200 can include a discrete device, an antenna radiating element 116, or the like. The second via transition 216 is at a second end of the transmission line 208, and is the point at which a second signal via 236 that extends in a direction that is generally perpendicular to the first and second surfaces of the circuit assembly 200 is connected to the transmission line 208. In this example the second signal via 236 extends through the first insulating layer 224 to another signal line or component 240 in another layer of the assembly 200, here an intermediate layer.

A ground structure or plane 244 is disposed on both sides of and in close proximity to the transmission line 208 and the via transitions 212 and 216. In this example, the ground plane 244 includes an aperture 248 that encompasses the transmission line 208 and the via transitions 212 and 216, leaving a gap or open space 252 between the ground plane 244 and the transmission line 208 and via transitions 212 and 216. The ground plane 244 can be connected to an additional ground plane (not shown) by one or more ground vias 256 that extend through one or more of the insulating layers 224 and 228. As can be appreciated by one of skill in the art after consideration of the present disclosure, the transmission line 208 and the ground plane 244 can be located on a surface of the first insulating layer 224. For example, the transmission line 208 and the ground plane 244 can be formed from a layer of a metal or other electrically conductive material, such as copper or aluminum, bonded to the insulating layer 224. Although the combination of the microstrip line 204 and ground plane 244 can provide at least some isolation of signals carried by the signal line 204 and other components, such isolation can be insufficient, particularly in applications in which the signal line 204 is carrying high frequency signals, and where the transmission line 208 or a via transition 212 or 216 is in close proximity to other signal lines or components.

Figure 4:
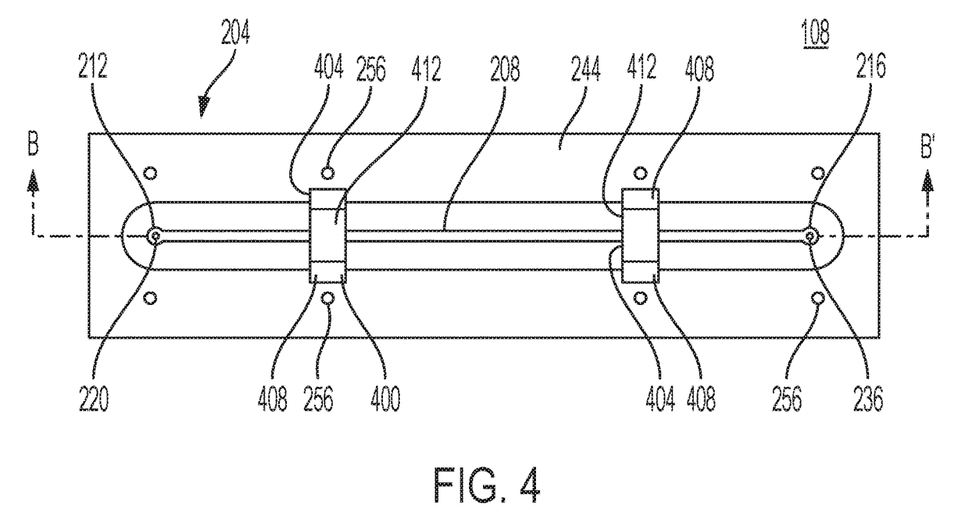
FIG. 4 is a top plan view of a signal line with RF suppression structures associated with a transmission line in accordance with embodiments of the present disclosure.
Figure 5:
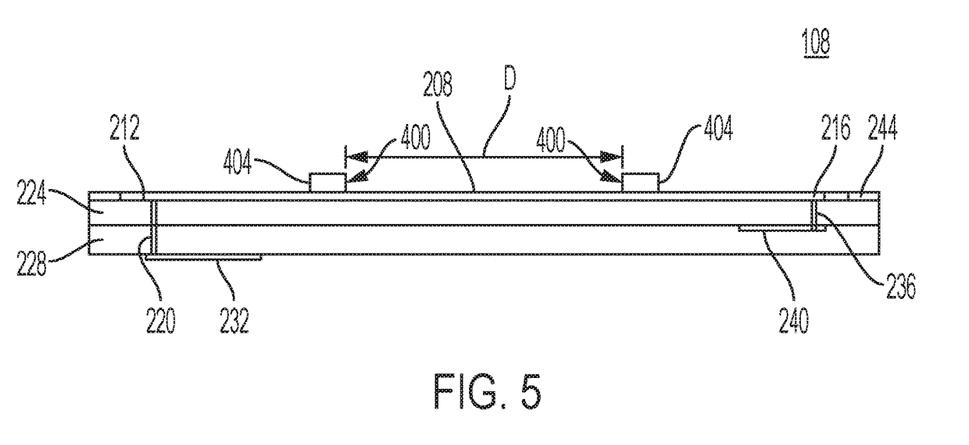
FIG. 5 is a cross section view of the signal line with RF suppression structures of FIG. 4.

FIG. 4 is a top plan view and FIG. 5 is a cross-section view taken along line B-B' of FIG. 4 of a circuit assembly 108 that includes an RF suppression structure including one or more RF suppression devices 400 in accordance with embodiments of the present disclosure. It is noted that various structures of the illustrated circuit assembly and the associated reference numbers are the same as those of the example background circuit board assembly 200 described in connection with FIGS. 2 and 3. Accordingly, it will be apparent that embodiments of the present disclosure, and in particular RF suppression devices 400 as disclosed herein can be easily applied to prior circuit assembly configurations. In addition, as will further be apparent, embodiments of the present disclosure enable modifications and improvements to background circuit configurations, for example by allowing closer spacing between signal lines 204 and interconnected or associated components, due to the RF suppression advantages provided by the inclusion of RF suppression devices 400 interconnected to and included in a circuit assembly 108 as described herein.

As shown in the example configuration depicted in FIGS. 4 and 5, the RF suppression devices 400 can be in the form of low ohm resistors 404. The low ohm resistors 404 are placed across the transmission line 208 portion of a signal line 204, to provide enhanced isolation. More particularly, the contacts or pads 408 of the resistors 404 are electrically connected to the ground plane 244 on either side of the transmission line 208. An insulated body or package portion 412 of the low ohm resistor 404 extends across the transmission line 208. Notably, the configuration and features of the circuit assembly 108 incorporating RF suppression devices in accordance with embodiments of the present disclosure can be the same as or similar to the example background circuit assembly 200 of FIGS. 2 and 3. Accordingly, adding an RF suppression structure or multiple RF suppression structures as disclosed herein to a circuit assembly can be done without requiring costly circuit redesigns. Alternatively, the routing, density, and other circuit assembly 108 design considerations can be modified as compared to circuit assemblies 200 that do not incorporate RF suppression structures as disclosed herein, due to the reduced RF emissions made possible by the RF suppression designs.

In accordance with at least some embodiments of the present disclosure, the location at which a resistor 404 is placed can coincide with the locations of ground vias 256, such that each of the contacts 408 is on or near a ground via 256. Where multiple resistors 404 are placed along the length of a transmission line 208, they can be spaced apart from one another by a distance D that is a fraction of a wavelength of a signal carried by the transmission line 208. For example, the fraction can be less than or equal to ¼ of the wavelength of a signal carried by the transmission line 208. In accordance with further embodiments of the present disclosure, the low ohm resistors 404 can be spaced apart from one another by a distance D that is less than or equal to 1/32 of a wavelength of a signal carried by the transmission line 208. In accordance with still further embodiments of the present disclosure, where the transmission line 208 carries multiple signals at different wavelengths, the spacing between the resistors 404 is less than or equal to a fraction of a wavelength of the signal or signals having a frequency at which coupling can otherwise occur. This spacing can have the effect of suppressing or blocking the radiation of electromagnetic energy resulting from the transmission of an RF signal or signals through the transmission line 208. More particularly, the radiation of energy resulting from the transmission of signals along the transmission line 208 can be suppressed.

As used herein, a low ohm resistor 404 can include a resistor with a resistance of less than 500 ohms. In accordance with further embodiments of the present disclosure, a low ohm resistor 404 can include a zero or near zero ohm resistor with a resistance of less than 5 ohms. In accordance with still other embodiments of the present disclosure, a low ohm resistor 404 can have a resistance of less than 0.050 ohms. In accordance with still further embodiments of the present disclosure, a low ohm resistor 404 can have a resistance of from 0.001 ohms to 0.050 ohms, or from 0.001 ohms to 0.003 ohms.

A low ohm resistor 404 provided as an RF suppression device 400 in accordance with embodiments of the present disclosure can be in the form of a surface mount or chip resistor. As can be appreciated by one of skill in the art, a surface mount resistor can be conveniently attached to a first (e.g. a top) or a second (e.g. a bottom) surface of a circuit board assembly, such as featured in at least some embodiments of a circuit assembly 108 in accordance with embodiments of the present disclosure, in a pick and place operation. However, embodiments of the present disclosure are not limited to including an RF suppression device 400 in the form of a low ohm resistor 404 provided in the form of a surface mount device. For example, an RF suppression device 400 may be provided as a low ohm resistor 404 in the form of an axial resistor or as a metal electrode leadless face (MELF) resistor. As further examples, an RF suppression device 400 in accordance with embodiments of the present disclosure can include a length of electrically conductive material that extends across the transmission line 208, that is electrically connected to the ground plane 244 on either side of the transmission line, and that is at least one of separated or insulated from the transmission line 208. Accordingly, an RF suppression device 400 or low ohm resistor 404 can be implemented as a length of wire that is insulated in a portion adjacent or in contact with the transmission line 208, or that is spaced apart from the transmission line 208.

Figure 6:
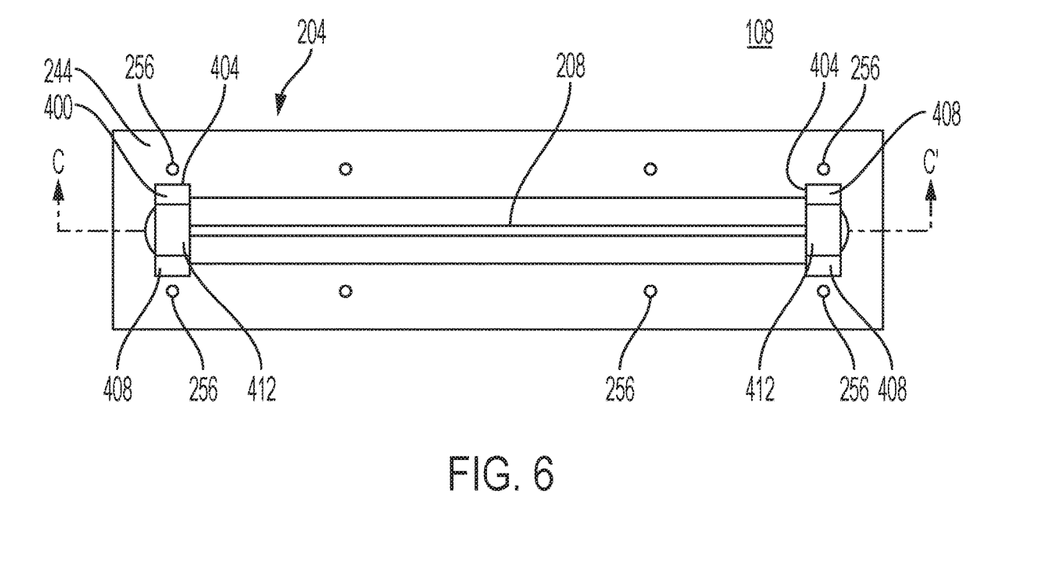
FIG. 6 is a top plan view of a signal line with RF suppression structures associated with via transitions in accordance with embodiments of the present disclosure.
Figure 7:
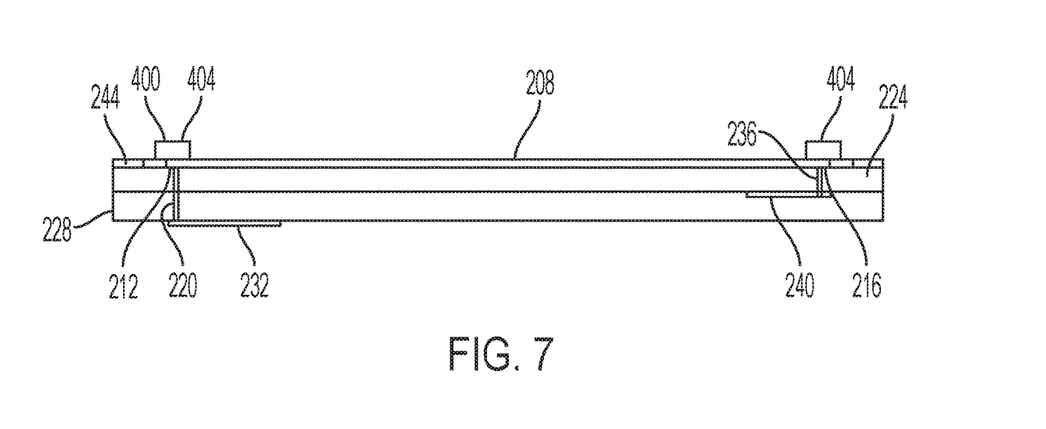
FIG. 7 is a cross section view of the signal line with RF suppression structures of FIG. 6.

In accordance with other embodiments of the present disclosure, and as depicted in top plan view in FIG. 6, and in a cross-section view taken along line C-C' of FIG. 6 in FIG. 7, a circuit assembly 108 in accordance with embodiments of the present disclosure can include RF suppression devices 400, for example in the form of one or more low ohm resistors 404, that are placed over the via transitions 212 and/or 216. The contacts or pads 408 of the resistors 404 are electrically connected to the ground plane 244 on either side of the portions of the transmission line 208 at which the via transitions 212 and 216 are located. In accordance with at least some embodiments of the present disclosure, an area of a resistor 204 placed over a via transition 212 or 216 is equal to or greater than an area of the via transition 212 or 216, such that the low ohm resistors 404 cover an area of the via transitions 212 and 216 in a plan view (e.g. as shown in FIG. 6). The positioning of the low ohm resistors 404 such that the via transitions 212 and 216 are covered or overlaid can have the effect of suppressing or blocking the radiation of electromagnetic energy resulting from the transmission of RF signals through the via transitions 212 and 216. Ground vias 256 can be provided at or near the point of connection between the contacts 408 of the resistors 404 and the ground plane 244. In this example, the via transitions 212 and 216 are at opposite ends of the transmission line 208, however, a via transition can be located at an intermediate location along a transmission line 208. Although in this example low ohm resistors 404 are placed over all of the via transitions 212 and 216, a low ohm transistor 404 can be placed over less than all of the via transitions associated with a transmission line 208.

Figure 8:
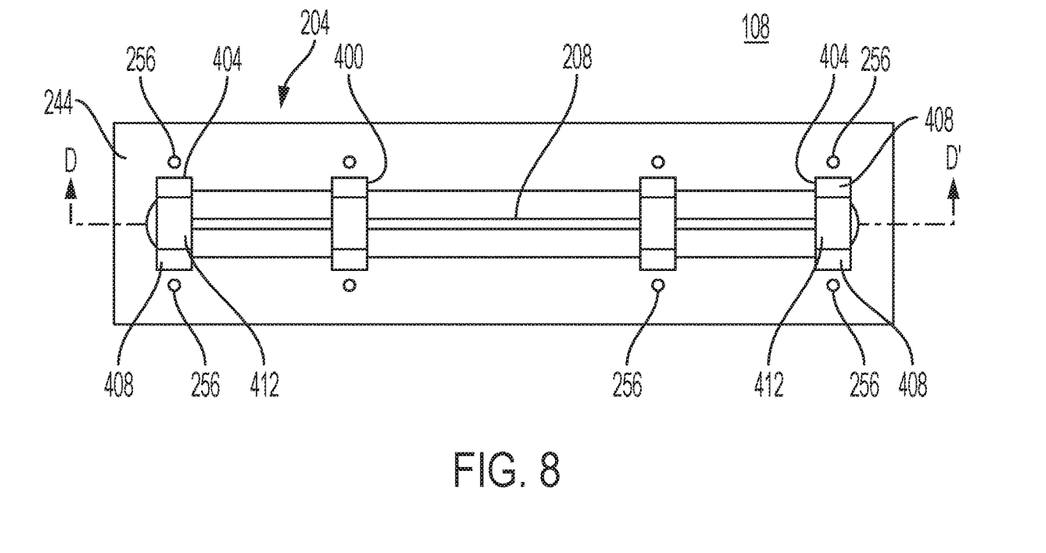
FIG. 8 is a top plan view of a signal line with RF suppression structures associated with a transmission line and with RF suppression structures associated with via transitions in accordance with embodiments of the present disclosure.
Figure 9:
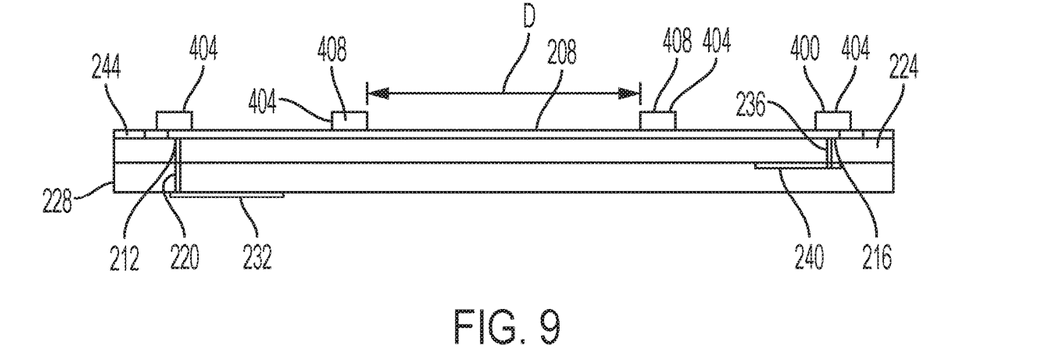
FIG. 9 is a top cross section view of the signal line with RF suppression structures of FIG. 8.

In accordance with still other embodiments of the present disclosure, and as depicted in top plan view in FIG. 8, and in a cross-section view taken along line D-D' of FIG. 8 in FIG. 9, a circuit assembly 108 in accordance with embodiments of the present disclosure can include one or more RF suppression devices, for example in the form of one or more low ohm resistors 404, that are placed at intervals along the length of a transmission line 208, and over via transitions 212 and/or 216. The contacts or pads 408 of the resistors 404 are electrically connected to the ground plane 244 on either side of the portions of the transmission line 208 at intervals along the length of the transmission line and over areas of the transmission line 208 at which the via transitions 212 and 216 are located. The spacing between adjacent low ohm resistors 404 can be less than or equal to ¼ of a wavelength of a signal or signals carried by the transmission line 208. In accordance with at least some embodiments of the present disclosure, the location at which a resistor 404 is placed can coincide with the locations of ground vias 256, such that each of the contacts 408 is on or near a ground via 256. The area of the low ohm resistors 404 that are placed over the via transitions may be equal to or greater than the area of the corresponding via transitions 212 and 216 respectively, such that the low ohm resistors 404 cover areas of the via transitions 212 and 216 in a plan view (e.g. as shown in FIG. 8).

Figure 10:
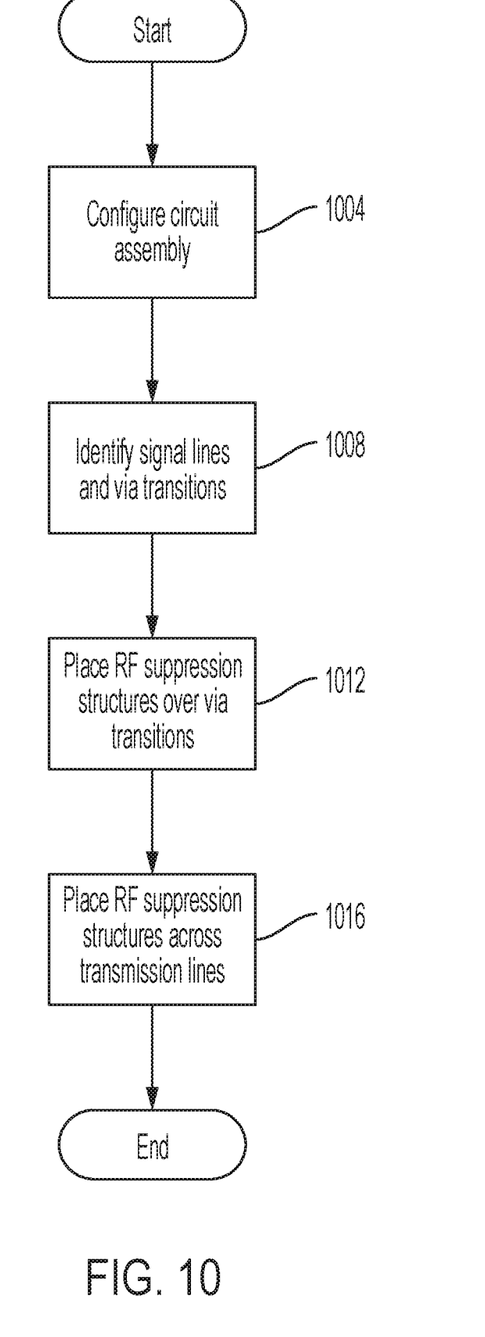
FIG. 10 is a flowchart depicting aspects of a process for isolating and reducing the radiation and coupling characteristics of an RF signal line in accordance with embodiments of the present disclosure.

FIG. 10 is a flowchart depicting aspects of a process for providing a circuit assembly 108 with RF isolation structures for isolating and reducing the radiation and coupling characteristics of RF signal lines in accordance with embodiments of the present disclosure. Initially, a circuit assembly 108 incorporating a signal line 204 is configured (step 1004). In accordance with embodiments of the present disclosure, the circuit assembly 108 may be in the form of, for example, a PCB assembly. Moreover, the circuit assembly 108 can include multiple conductive layers separated by insulating layers. In accordance with embodiments of the present disclosure, the signal line 204 is provided to carry RF signals. For example, but without limitation, the signal line 204 can be provided to carry signals at microwave frequencies. In accordance with embodiments of the present disclosure, the signal line 204 includes a transmission line 208 that is located within an aperture or open area formed in a ground plane 244. The transmission line 208 and the ground plane 244 may further be formed by etching or milling a common plane or sheet of conductive material bonded or adhered to a first insulating layer or substrate 224. As another example, the transmission line 208 and the ground plane 244 can be formed by depositing conductive material on an insulating layer or substrate 224. The transmission line 208 can be connected to one or more signal vias 220 or 236 that extend through one or more insulating layers of the circuit assembly 108. The transmission line 208 can therefore be connected to signal lines or components 232 or 240 on other layers of the circuit assembly 108.

At step 1008, signal lines 208 and via transitions 212 and 216 associated with the signal line or signal lines 204 that are formed on one of the outside surfaces of the circuit assembly 108, that carry one or more RF signals, and that are susceptible of producing RF emissions while in operation are identified. An RF suppression structure 400 can then placed over each via transition 212 and 216 (step 1012). The RF suppression structures 400 placed over the via transitions can be selected or formed such that they have an area that is equal to or greater than an area of the associated via transition when considered in a plan view. RF suppression structures 400 can also be placed across the identified transmission line portions 208 of the identified signal lines 204 (step 1016). The RF suppression structures 400 can be placed at intervals along a transmission line 208 with a spacing between adjacent RF suppression structures, including any RF suppression structures 400 placed over via transitions associated with the transmission line 208, that is equal to or less than one quarter of the wavelength of a signal of concern that is to be carried by the transmission line 208. The process can then end.

In accordance with embodiments of the present disclosure, the RF suppression structures 400 are in the form of low ohm resistors 404. In accordance with further embodiments of the present disclosure, the low ohm resistors 404 are surface mount resistors. The surface mount low ohm resistors 404 can be placed on one or both of the outside surfaces of the circuit board assembly 108 using conventional pick and place techniques. In accordance with embodiments of the present disclosure, the signal of concern is the highest frequency signal expected to be carried by the transmission line 208 that has the potential to cause RF radiation to be emitted from the signal line 204.

Although various examples of embodiments of the present disclosure have been presented, it should be appreciated that other variants are possible. For instance, any number of low ohm resistors 404 or other RF suppression devices 400 can be associated with a transmission line 208. In addition, the resistance values of low ohm resistors 404 associated with a transmission line 208 can be the same as or different from one another. RF suppression devices 400 can be associated with multiple transmission lines 208 included in a circuit assembly 108. In addition, RF suppression devices 400 can be provided for suppression of RF emissions in signal lines on either or both sides of a circuit board stack or assembly 108. In addition, none, some, or all of the low ohm resistors 404 associated with a transmission line 208 can be placed such that the contacts of the low ohm resistors are near or on a ground via 256.

Embodiments of the present disclosure enable enhanced isolation of signals using off the shelf, surface mount resistors. Because such resistors can be placed in commonly used pick and place operations, and because they are themselves inexpensive, the enhanced shielding or suppression provided by embodiments of the present disclosure can be implemented at low cost. In addition, by enabling closer routing of signal lines, internal stripline layers that might otherwise be required to route signals within an antenna or other RF assembly can be eliminated, further reducing costs. The use of mechanical shielding can also be avoided. The performance of a device using isolation as provided by embodiments of the present disclosure can also be enhanced as compared to conventional circuit designs, by reducing beam to beam coupling, digital cross talk, and the risk of unwanted RF oscillation.

Advantages of embodiments of the present disclosure as compared to alternate configurations can include: reduction in RF to RF coupling, power supply, and digital cross talk; significantly lower production costs; higher PCB/PWB yield; reduction in the number of lamination cycles; lowered drill count; reduced need for back drilling; reduced need for ormets, blind vias, buried vias, and microvias; increased vibration reliability by eliminating the need to mount relatively large shielding structures to the PCB/PWB; and eliminating the need for custom shielding structures. In addition, embodiments of the present disclosure eliminate guided wave coupling into fixtures, such as cans and heatsinks, by attenuating or eliminating oscillations caused by moding.

In accordance with at least some embodiments of the present disclosure, the technology encompasses:

(1) A circuit assembly, comprising:
 a transmission line;
 a ground plane, wherein the ground plane extends along opposite sides of the transmission line;
 a first low ohm resistor, wherein the first low ohm resistor has a first contact electrically connected to the ground plane on a first side of the transmission line, wherein the first low ohm resistor has a second contact electrically connected to the ground plane on a second side of the transmission line, and wherein at least a portion of the first low ohm resistor extends over the transmission line.

(2) The circuit assembly of (1), further comprising:
 a second low ohm resistor, wherein the second low ohm resistor has a first contact electrically connected to the ground plane on a first side of the transmission line, wherein the second low ohm resistor has a second contact electrically connected to the ground plane on a second side of the transmission line, and wherein at least a portion of the first low ohm resistor extends over the transmission line.

(3) The circuit assembly of (2), wherein the first low ohm resistor is spaced apart from the second low ohm resistor by a distance that is less than or equal to a fraction of a wavelength of a highest frequency signal carried by the transmission line.

(4) The circuit assembly of (3), wherein the fraction is ¼.

(5) The circuit assembly of (3), wherein the fraction is ¹⁄₃₂.

(6) The circuit assembly of any of (2) to (5), further comprising:
a third low ohm resistor; and
a first signal via, wherein the third low ohm resistor is placed over a transition between the first signal via and the transmission line.

(7) The circuit assembly of (6), further comprising:
a fourth low ohm resistor; and
a second signal via, wherein the fourth low ohm resistor is placed over a transition between the second signal via and the transmission line.

(8) The circuit assembly of (7), wherein the transition between the first signal via and the transmission line is at a first end of the transmission line, and wherein the transition between the second signal via and the transmission line is at a second end of the transmission line.

(9) The circuit assembly of any of (1) to (7), wherein a spacing between each low ohm resistor and an adjacent low ohm resistor is no more than ¼ of a wavelength of a signal to be carried by the transmission line.

(10) The circuit assembly of any of (2) to (5), further comprising:
a first signal via, wherein the first low ohm resistor is placed over a transition between the first signal via and the transmission line; and
a second signal via, wherein the second low ohm resistor is placed over a transition between the second signal via and the transmission line.

(11) The circuit assembly of any of (1) to (10), further comprising:
a plurality of ground vias, wherein a first contact of the first low ohm resistor is at least one of adjacent or directly connected to a first one of the ground vias, and wherein a second contact of the first low ohm resistor is at least one of adjacent or directly connected to a second one of the ground vias.

(12) The circuit assembly of any of (1) to (11), wherein the first low ohm resistor has a resistance of less than 500 ohms.

(13) The circuit assembly of any of (1) to (11), wherein the first low ohm resistor has a resistance of less than 10 ohms.

In accordance with further aspects of the present disclosure, the technology encompasses:

(14) A circuit assembly, comprising:
a first surface, wherein a transmission line is located on the first surface, wherein a ground structure is located on the first surface and adjacent opposite sides of the transmission line;
a plurality of radio frequency (RF) suppression structures, wherein a first contact of each of the RF suppression structures is connected to the ground structure on a first side of the transmission line, wherein a second contact of each of the RF suppression structures is connected to the ground structure on a second side of the transmission line, and wherein a body portion of each of the RF suppression structures extends across at least a portion of the transmission line.

(15) The circuit assembly of (14), further comprising:
at least a first via transition, wherein a body portion of one of the radio frequency suppression structures extends across an area of the first via transition.

(16) The circuit assembly of (14) or (15), wherein the radio frequency suppression structures are spaced apart from one another by a distance equal to or less than ¼ of a wavelength of a highest frequency signal carried by the transmission line.

(17) The circuit assembly of any of (14) to (16), wherein the radio frequency suppression structures are low ohm resistors.

(18) The circuit assembly of (14), (16), or (17), further comprising:
a second surface;
a first antenna element, wherein the first antenna element is on the second surface; and
a least a first signal via, wherein the first signal via is connected to the transmission line at a first via transition at the first surface, wherein the second signal via is connected to the first antenna element at the second surface, and wherein a first one of the radio frequency suppression structures is placed over an area of the first signal via along a view that is perpendicular to the first surface.

In accordance with still further embodiments of the present disclosure, the technology encompasses:

(19) A method, comprising:
forming a signal via in a circuit board;
forming a transmission line on a first surface of the circuit board, wherein the transmission line is electrically connected to the signal via at a via transition;
forming a ground structure on the first surface of the circuit board, wherein the ground structure includes an aperture that surrounds the transmission line; and
placing a plurality of radio frequency (RF) suppression structures over the transmission line, wherein the RF suppression structures are electrically connected to the ground structure, and wherein at least one of the RF suppression structures is located over the via transition.

(20) The method of (19), wherein the RF suppression structures are low ohm resistors, and wherein the low ohm resistors are placed over the transmission line in a pick and place operation.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:
1. A circuit assembly, comprising:
a transmission line;
a ground plane, wherein the ground plane extends along opposite sides of the transmission line;
a first low ohm resistor, wherein the first low ohm resistor has a first contact electrically connected to the ground plane on a first side of the transmission line, wherein the first low ohm resistor has a second contact electrically connected to the ground plane on a second side of the transmission line, and wherein at least a portion of the first low ohm resistor extends over the transmission line; and a first signal via, wherein the first signal via is connected to the transmission line, wherein the first signal via extends in a direction perpendicular to the transmission line, wherein the first low ohm resistor is placed over the first signal via as viewed along the direction perpendicular to the transmission line, and wherein radiation of electromagnetic energy resulting from transmission of radio frequency signals through the connection between the first signal via and the transmission line is suppressed.

2. The circuit assembly of claim 1, further comprising:
a second low ohm resistor, wherein the second low ohm resistor has a first contact electrically connected to the ground plane on the first side of the transmission line, wherein the second low ohm resistor has a second contact electrically connected to the ground plane on the second side of the transmission line, and wherein at least a portion of the second low ohm resistor extends over the transmission line.

3. The circuit assembly of claim 2, wherein the first low ohm resistor is spaced apart from the second low ohm resistor by a distance that is less than or equal to a fraction of a wavelength of a highest frequency signal carried by the transmission line.

4. The circuit assembly of claim 3, wherein the fraction is $1/32$.

5. The circuit assembly of claim 2, further comprising:
a third low ohm resistor; and
a second signal via, wherein the second signal via is connected to the transmission line, wherein the second signal via extends in the direction perpendicular to the transmission line, wherein the third low ohm resistor is placed over the second signal via as viewed along the direction perpendicular to the transmission line, and wherein radiation of electromagnetic energy resulting from transmission of radio frequency signals through the connection between the second signal via and the transmission line is suppressed.

6. The circuit assembly of claim 5, wherein the connection between the first signal via and the transmission line is at a first end of the transmission line, wherein the connection between the second signal via and the transmission line is at a second end of the transmission line.

7. The circuit assembly of claim 6, wherein a spacing between each low ohm resistor and an adjacent low ohm resistor is no more than $1/4$ of a wavelength of a signal to be carried by the transmission line.

8. The circuit assembly of claim 2, further comprising:
a second signal via, wherein the second signal via extends in the direction perpendicular to the transmission line, wherein the second signal via is connected to the transmission line, wherein the second low ohm resistor is placed over the second signal via as viewed along the direction perpendicular to the transmission line, and wherein radiation of electromagnetic energy resulting from transmission of radio frequency signals through the connection between the second signal via and the transmission line is suppressed.

9. The circuit assembly of claim 1, further comprising:
a plurality of ground vias, wherein the first contact of the first low ohm resistor is at least one of adjacent or directly connected to a first one of the ground vias, and wherein the second contact of the first low ohm resistor is at least one of adjacent or directly connected to a second one of the ground vias.

10. The circuit assembly of claim 1, wherein the first low ohm resistor has a resistance of less than 10 ohms.

11. The circuit assembly of claim 1, wherein the transmission line is located within an aperture formed in the ground plane, and wherein the portions of the ground plane that extend along opposite sides of the transmission line are integral to one another.

12. The circuit assembly of claim 11, wherein most of the length of the portion of the ground plane that extends along a first side of the transmission line is a same distance from the transmission line.

13. A circuit assembly, comprising:
a first surface, wherein a transmission line is located on the first surface, wherein a ground structure is located on the first surface and adjacent opposite sides of the transmission line;
a plurality of radio frequency (RF) suppression structures, wherein a first contact of each of the RF suppression structures is connected to the ground structure on a first side of the transmission line, wherein a second contact of each of the RF suppression structures is connected to the ground structure on a second side of the transmission line, and wherein a body portion of each of the RF suppression structures extends across at least a portion of the transmission line; and
at least a first via transition, wherein a first signal via is connected to the transmission line at the first via transition, wherein a body portion of a first one of the RF suppression structures extends over the first via transition when the first via transition is viewed in a direction perpendicular to the first surface, and wherein radiation of electromagnetic radiation resulting from transmission of radio frequency signals through the first via transition is suppressed.

14. The circuit assembly of claim 13, wherein the radio frequency suppression structures are spaced apart from one another by a distance equal to or less than $1/4$ of a wavelength of a highest frequency signal carried by the transmission line.

15. The circuit assembly of claim 13, wherein the radio frequency suppression structures are low ohm resistors.

16. The circuit assembly of claim 13, further comprising:
a second surface;
a first antenna element, wherein the first antenna element is on the second surface; and
wherein the first signal via is connected to the first antenna element at the second surface.

17. The circuit assembly of claim 13, wherein the transmission line is located within an aperture formed in the ground structure, and wherein the portions of the ground structure that extend along opposite sides of the transmission line are integral to one another.

18. The circuit assembly of claim 17, wherein most of the length of the portion of the ground structure that extends along a first side of the transmission line is a same distance from the transmission line.

19. A method, comprising:
forming a signal via in a circuit board;
forming a transmission line on a first surface of the circuit board, wherein the transmission line is electrically connected to the signal via at a via transition;
forming a ground structure on the first surface of the circuit board, wherein the ground structure includes an aperture that surrounds the transmission line; and
placing a plurality of radio frequency (RF) suppression structures over the transmission line, wherein the RF suppression structures are electrically connected to the ground structure, and wherein at least one of the RF suppression structures is located over the via transition when the via transition is viewed in a direction perpendicular to the first surface of the circuit board, and wherein radiation of electromagnetic radiation resulting from transmission of radio frequency signals through the via transition is suppressed.

20. The method of claim 19, wherein the RF suppression structures are low ohm resistors, and wherein the low ohm resistors are placed over the transmission line in a pick and place operation.

\* \* \* \* \*